(12) United States Patent
Willets et al.

(10) Patent No.: US 7,370,666 B2
(45) Date of Patent: May 13, 2008

(54) POWER SYSTEM WITH COMPUTER-CONTROLLED FUEL SYSTEM

(75) Inventors: Julie Willets, Overland Park, KS (US); Jason Brinkley, Overland Park, KS (US); Jerry Meyers, Olathe, KS (US); Larry Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 213 days.

(21) Appl. No.: 11/225,987

(22) Filed: Sep. 14, 2005

(65) Prior Publication Data
US 2007/0234975 A1    Oct. 11, 2007

(51) Int. Cl.
| F16K 31/02 | (2006.01) |
| F02C 7/22 | (2006.01) |
| F02C 7/232 | (2006.01) |
| H02J 9/00 | (2006.01) |
| F02B 43/08 | (2006.01) |
| F02D 19/10 | (2006.01) |

(52) U.S. Cl. .................. 137/487.5; 60/39.465; 307/64; 123/3; 123/27 GE

(58) Field of Classification Search .......... 123/3, 123/27 GE, 575, 457, 510, 525; 137/487.5; 307/64; 429/22, 25, 34; 60/39.34, 39.465; 700/286–287; 701/100
See application file for complete search history.

(56) References Cited

U.S. PATENT DOCUMENTS

| 4,283,634 A | 8/1981 | Yannone et al. |
|---|---|---|
| 4,598,542 A | 7/1986 | Reynolds |
| 4,736,111 A | 4/1988 | Linden |
| 5,737,202 A | 4/1998 | Shimamori |
| 5,767,637 A | 6/1998 | Lansberry |
| 5,929,538 A | 7/1999 | O'Sullivan et al. |
| 6,184,593 B1 | 2/2001 | Jungreis |
| 6,304,006 B1 | 10/2001 | Jungreis |
| 6,380,637 B1 | 4/2002 | Hsu et al. |
| 6,452,289 B1 | 9/2002 | Lansberry et al. |
| 6,463,738 B1 | 10/2002 | Pinkerton et al. |
| 6,492,047 B1 | 12/2002 | Peled et al. |
| 6,536,456 B2 * | 3/2003 | Dickerson et al. ............ 137/12 |
| 6,700,214 B2 | 3/2004 | Ulinski et al. |
| 6,703,722 B2 | 3/2004 | Christensen |
| 6,879,052 B1 | 4/2005 | Johnson |
| 6,885,112 B2 | 4/2005 | Johnson |
| 6,930,402 B1 | 8/2005 | Johnson et al. |

(Continued)

FOREIGN PATENT DOCUMENTS

EP    0 595 191    5/1994

(Continued)

OTHER PUBLICATIONS

"A High-Availability Backup Source of Energy", J.C. Chigolet et al. dated Sep. 27, 1993.

(Continued)

Primary Examiner—Stephen K. Cronin
Assistant Examiner—Ka Chun Leung

(57) ABSTRACT

The present invention is a fuel-control system for a turbine which includes a programmable logic controller. The controller manages utility and stored natural gas sources using a surge tank and pressure-control valve arrangement and is backed up by a hydrogen-powered fuel cell.

7 Claims, 4 Drawing Sheets

U.S. PATENT DOCUMENTS

| | | |
|---|---|---|
| 6,960,838 B2 | 11/2005 | Johnson |
| 2001/0009338 A1 | 7/2001 | Reutere |
| 2004/0094963 A1 | 5/2004 | Johnson |
| 2004/0095022 A1 | 5/2004 | Johnson |
| 2006/0263656 A1* | 11/2006 | Johnson et al. ............... 429/19 |

FOREIGN PATENT DOCUMENTS

| | | |
|---|---|---|
| EP | 0 718 904 | 6/1996 |
| WO | 99/32762 | 7/1999 |
| WO | 2004/047206 | 6/2004 |
| WO | 2004/047250 | 6/2004 |
| WO | 2004/047262 | 6/2004 |
| WO | 2004/105212 | 12/2004 |

OTHER PUBLICATIONS

"Advances Promise High Cycle Life, Commercial Viability for Electric Vehicles," Dept. of Energy, U.S.A., April (lumps).

Szary, Patrick J. and Dr. Ali Maher, "PEM Fuel Cell Integration With a Hydrogen Generator on a beach," Final Report Jun. 2001, FHWA-NJ-Mar. 2001, New Jersey Department of Transportation.

* cited by examiner

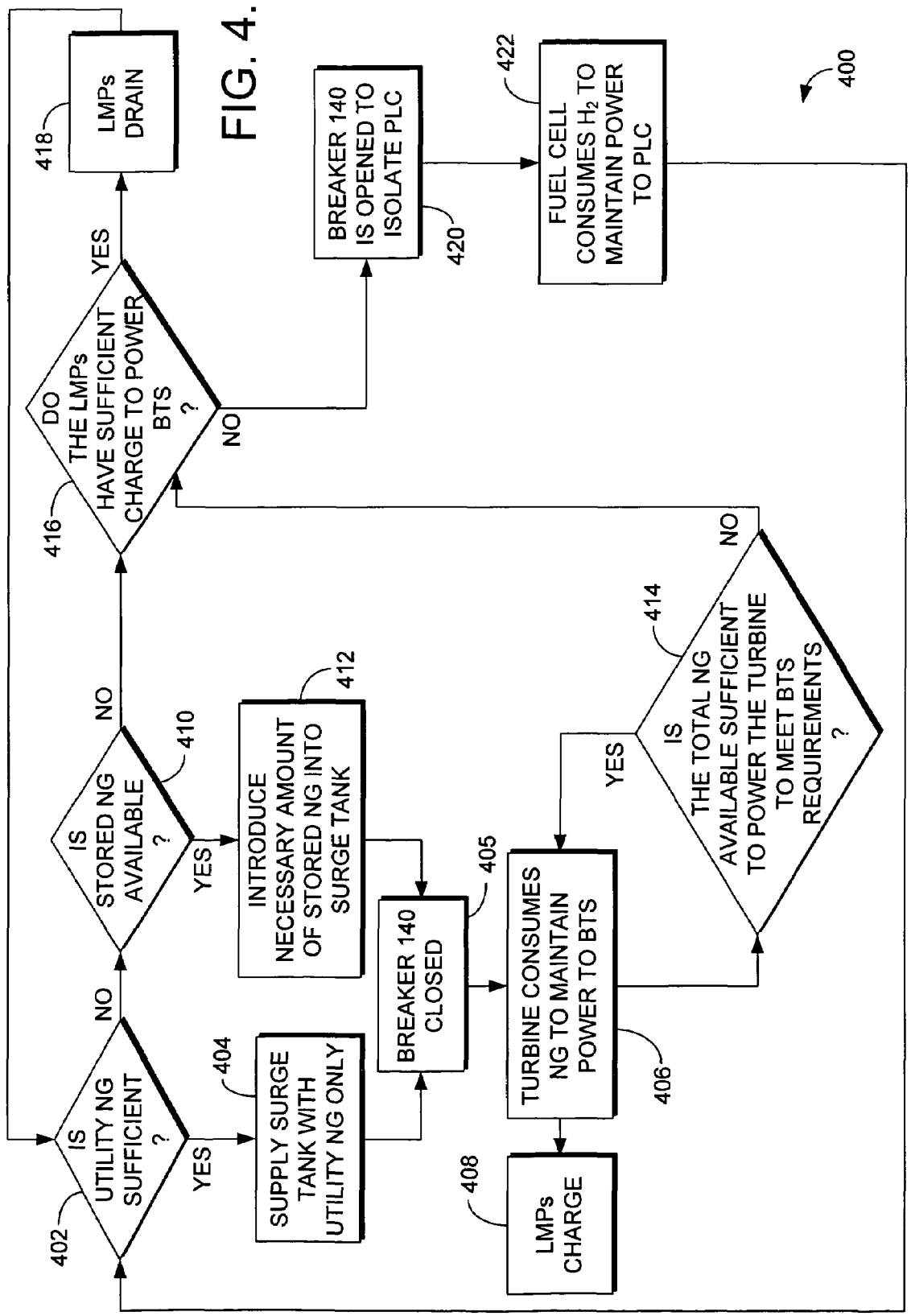

POWER SYSTEM WITH COMPUTER-CONTROLLED FUEL SYSTEM

CROSS-REFERENCE TO RELATED APPLICATIONS

None.

STATEMENT REGARDING FEDERALLY SPONSORED RESEARCH OR DEVELOPMENT

None.

FIELD OF THE INVENTION

In general, this invention is a control system for a power-producing facility. More specifically, the invention relates to the field of using control systems to maintain the delivery of gas fuel to a turbine. The invention also relates to the field of providing backup power to a controller which exists in a power-system environment.

BACKGROUND OF THE INVENTION

Conventional power systems for telecommunications facilities have used AC which is purchased from a commercial utility. Because of blackouts and other disturbances in the commercial power grid, some facilities use a diesel generator to back up the commercial AC. When the AC power goes dead, the diesel generator is activated. It takes a while for the generator to come online, however. In the interim, an array of batteries will bridge the downtime. If the diesel generator fails, e.g., runs out of fuel, the batteries will drain to power the facility until they run out.

Gas turbines have been widely used by utility companies to generate electrical power. Many are adapted such that they operate on natural gas. Such turbines are normally included in an arrangement which ensures that the natural gas fuel is delivered at a steady pressure. This prevents erratic electrical production.

SUMMARY OF THE INVENTION

The present invention is a fuel-control system for a gas-consuming device. The system includes a controller (e.g., a programmable logic controller). The controller is used within an environment in which a first source of a first gas is received through a first conduit which leads into a chamber. There is also a first pressure-control valve and a first sensor in the first conduit. The first sensor takes a first-sensor reading regarding a first pressure. This reading is transmitted to the controller.

The system also includes a second source of a second gas derived from a storage container through a second conduit into the chamber. A second pressure-control valve is located in the second conduit along with a second sensor. The second sensor also takes readings which are transmitted to the controller.

The controller uses readings from the first and second sensors to manipulate the first and second pressure-control valves to maintain a steady pressure level in a third conduit which runs from the chamber to the gas-consuming device.

In another embodiment, the third conduit also has a sensor and a pressure-control valve to assist in maintaining steady gas pressure so that the turbine is able to run smoothly.

The system also includes an electrical power backup system for the controller. This system uses the output from a fuel cell to power the controller in the event the turbine fails (e.g., runs out of fuel).

BRIEF DESCRIPTION OF THE DRAWINGS

The present invention is described in detail below with reference to the attached drawing figures, wherein:

FIG. 4 is a flow diagram showing the processes of the present invention.

DETAILED DESCRIPTION OF THE INVENTION

The system disclosed herein uses a gas turbine generator as the primary source of power to sustain DC power to a DC bus which is electrically connected to a base transceiver station (BTS). The turbine normally operates on natural gas from a utility pipeline, but if the utility source is unavailable (e.g., a backhoe ruptures a pipeline) or the pressure has dropped below what is necessary to drive the turbine, the system can call on a backup source of natural gas which is stored in tanks. The turbine is able to run on only utility natural gas, partial utility and partial stored natural gas, or only stored natural gas thanks to a valve arrangement using pressure-controlled valves and a surge tank. The pressure-controlled valves are controlled using a controller. The controller may be some kind of computing device, e.g., a programmable logic controller (PLC) or a microprocessor. A PLC is used in the preferred embodiment. This arrangement makes for smooth transitioning between utility and stored natural gas sources.

Lithium Metal Polymer batteries (LMPs) are connected into the DC bus. The LMPs are always online. When the electrical output of the turbine generator dips, the LMPs will cover the dip so that the BTS does not experience any temporary power drop. When the turbine is inactive, the LMPs drain to back up the BTS.

Should the LMPs completely lose their charge to the point that the BTS power requirements are not met, the system includes a low-power fuel cell which is used to back up the PLC only. When the fuel cell is brought online, the PLC circuit is isolated from the DC bus by throwing a breaker. Because it is backed up with the fuel cell, the PLC remains functional and is able to continue to control the valves even though the DC bus is dead. It also enables the PLC to continue to transmit alarm messages so that interested parties are able to monitor what is happening at the site.

Figure 1:
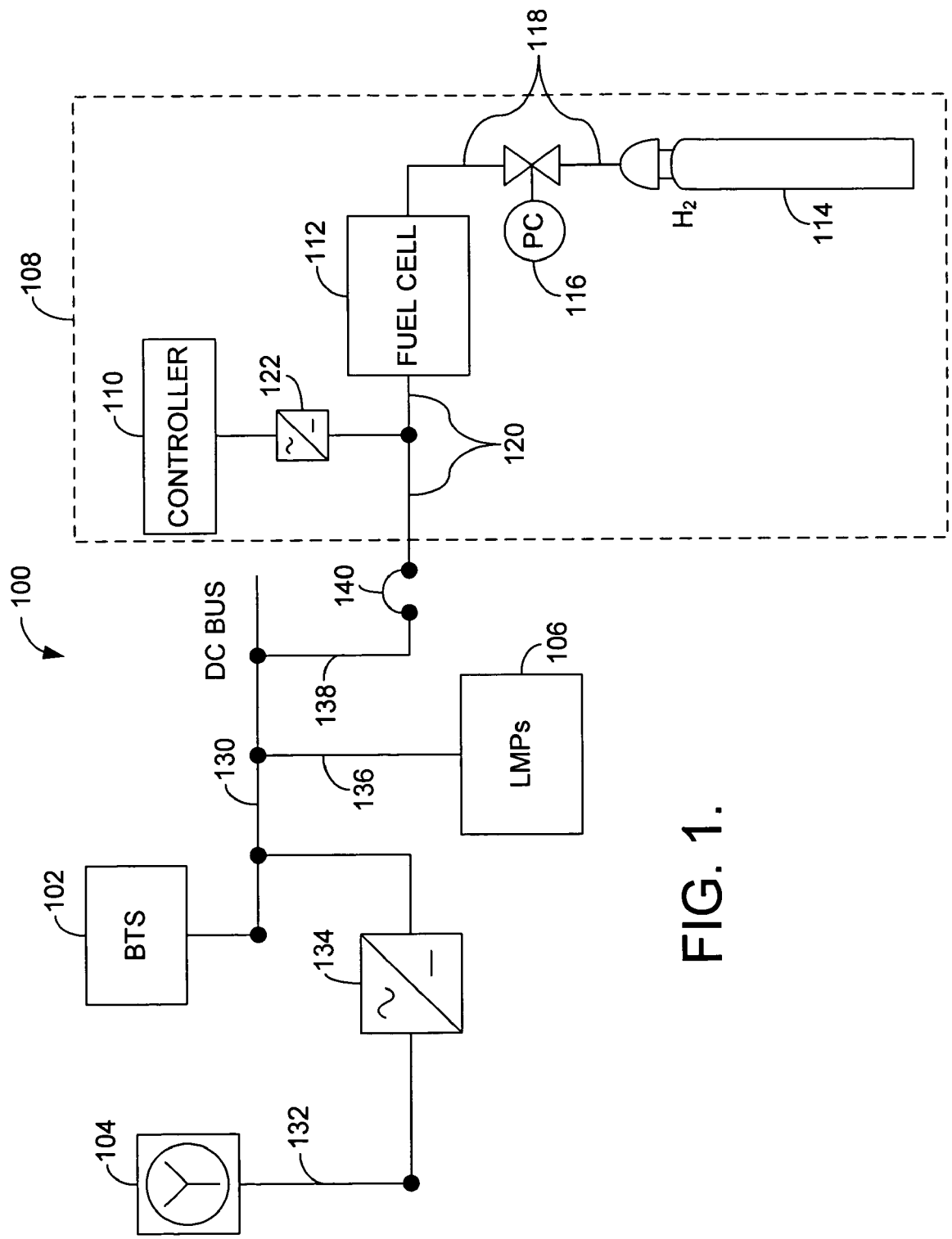
FIG. 1 is a schematic diagram showing the power system of the present invention.

FIGS. 1-4 help in understanding the disclosed embodiment. Referring first to FIG. 1, a schematic diagram 100 shows the many components of a power system which relies primarily on a microturbine generator 104 which is backed up by one or more LMP batteries 106. This backup arrangement is used to ensure that DC power is maintained to the power-distribution unit (not shown) for a BTS 102. The BTS is the radio-hardware portion of a cellular base station. It is involved in the transmission and receiving of voice and data. Power distribution units comprise the electrical equipment for making the necessary connections into the telecommunication-cell-site equipment.

Microturbine generator 104 produces AC. BTS 102 consumes DC, not AC. Thus, the AC received from microturbine generator 104 must be converted. To do this, system 100 includes one or more rectifiers 134. Rectifiers 134 convert AC to DC. The particular rectifiers used in the present invention are switch mode rectifiers (SMRs). SMRs are advantageous for use here because they are highly efficient, small, and relatively light weight.

The DC output from the rectifiers 134 is electrically connected into a DC bus 130. The DC input to BTS 102 is also connected to bus 130. Thus, BTS 102 is able to receive its primary source of power from turbine 104.

If the turbine fails for some reason, e.g., for lack of fuel, the LMPs 106 will immediately pick up the load because they are also connected into bus 130. This connection also causes them to be charged when the turbine is functional. The LMPs used in the preferred embodiment of the invention are 48-volt, 63-amp-hour batteries manufactured by Avestor, Inc. (Model No. SE 48S63), but the scope of the invention is not to be limited to any particular battery, manufacturer, or amp-hour/voltage level used. Other kinds of batteries could be used instead and still fall within the scope of the present invention. Three batteries are used in the present embodiment.

FIG. 1 also discloses a control system 108 which includes a controller 110 which is, in the preferred embodiment, some form of computing device. Controller 110 serves numerous purposes. First, it is used to send alarm information to an outside monitoring administrator when certain conditions are sensed. Sensors at different points will transmit alarm messages if certain events occur. For example, pressure sensors will indicate disruption in availability of utility natural gas, stored natural gas, and stored hydrogen (which is used to fuel a PLC backup fuel cell). A pressure sensor will also be used to sense disruption in the feeder line to the turbine. Other alarms will be transmitted in the event of electrical irregularities. Properly located voltage sensors will indicate voltage drops at the turbine, LMP, and fuel-cell outputs. These alarms will be transmitted to an interested party. This enables remote monitoring by an administrator not at the site.

Second, controller 110 regulates the delivery of natural gas to turbine 104 and enables the automated administration of utility versus stored sources with preference given to natural gas from the utility. This is done using a valve arrangement which is responsive to measurements taken by a plurality of pressure sensors.

Third, the controller is adapted to open and shut a breaker 140 to isolate the control system from the DC bus upon the occurrence of certain conditions as will be discussed in more detail later.

PLCs like the one used in the preferred embodiment as controller 110 will be known to those skilled in the art as devices which are widely used for industrial control applications. They employ the hardware architecture of a computer but also include a relay control subsystem. A PLC uses these components to automatically respond to sensed conditions in the power system. Though a PLC is used in the preferred embodiment, another kind of device, such as microprocessor arrangements could be used instead, and other computing devices could also be used and still fall within the scope of the present invention.

Controller 110 is supported by an independent backup system. The backup system includes a fuel cell 112 which is driven using gaseous hydrogen fuel from a hydrogen tank 114.

Fuel cells are electrochemical-energy-conversion devices. They utilize hydrogen and oxygen. Proton exchange membranes (or other equivalent devices) in the fuel cell cause the electron from hydrogen to be removed temporarily. Later, this hydrogen electron is returned when the hydrogen is combined with the oxygen to produce water. This creates electricity. The reaction is entirely noncombustive and generates DC electrical power. Because the only by-products of this reaction are heat, water, and electricity, a fuel cell is friendly to the environment. In addition, a fuel cell is capable of providing electrical power for as long as hydrogen fuel is supplied to the unit. It does not discharge over time like a battery.

In the preferred embodiment disclosed in FIG. 1, fuel cell 112 includes a plurality of PEMs. Though fuel cell 112 used in the preferred embodiment uses PEMs, other fuel-cell technologies exist which might be used instead and still fall within the scope of the present invention. One example of a PEM-type fuel cell which is suitable for use with the present invention is a 500W modular, cartridge-based, proton exchange membrane power module manufactured by ReliOn, Inc. of Spokane, Wash.

In the FIG. 1 arrangement, fuel cell 112 receives hydrogen fuel via a tube 118 which runs from a pressurized hydrogen tank 114. The flow rate of hydrogen is controlled using an automated pressure-control valve 116 which is disposed in tube 118 between the tank and fuel cell. If the stored hydrogen is released from the tank 114 by opening valve 116, it is consumed by fuel cell 112 to generate DC power. This DC power is introduced into line 120 so that it is able to be consumed by the controller 110. Because a PLC uses AC power, the DC output of fuel cell 112 must be converted. This is done by a power inverter 122 which is located between controller 110 and line 120.

The entire control system 108 with its independent backup arrangement comprising fuel cell 112 is able to be electronically isolated from DC bus 130 using a breaker 140 which is adapted (using controller 110) to open up when voltage in the DC bus reaches a predetermined minimum voltage.

Figure 2:
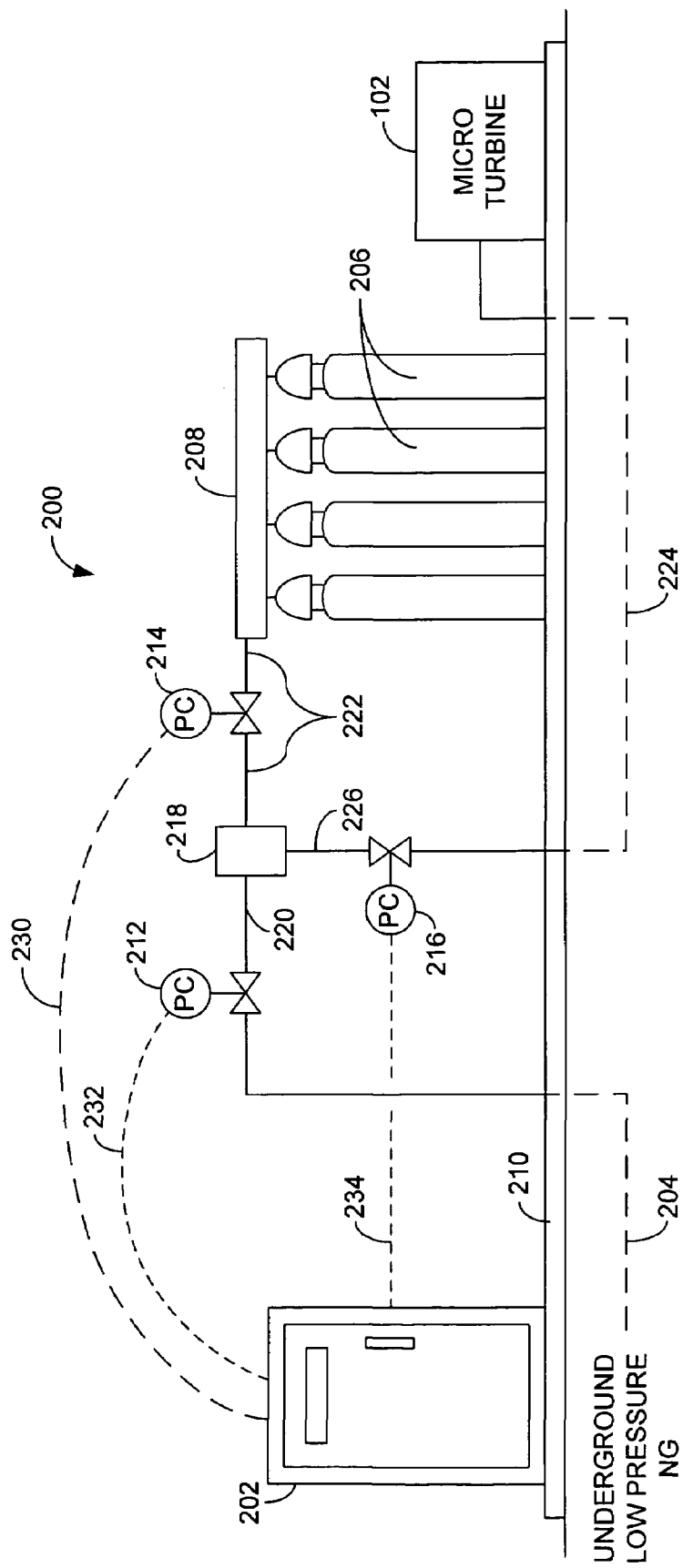
FIG. 2 depicts the fuel-control system of the present invention.

FIG. 2 shows a fuel-control side 200 of the invention. The fuel controls are housed in a cabinet 202 which is located on a platform 210. Platform 210 may be a concrete slab or some other supporting surface.

A primary source of fuel is natural gas which is delivered in an underground pipeline 204. A secondary source of natural gas is maintained in a plurality of natural gas tanks 206. These tanks maintain natural gas at high pressures and are all incorporated into a header 208. Header 208 serves as a manifold which causes the pressure from each of the tanks to be equalized.

A plurality of automated pressure-control valves (which in the preferred embodiment are explosion proof valves) are incorporated into the system so that both (i) the underground primary utility source of natural gas from pipe 204 and (ii) stored source 206 can be used as fuel for the microturbine 104 either alternatively or at the same time. Explosion proof valves are widely used in industry for controlling the flow of natural gas and other explosive gases. A primary pressure-control valve 212 regulates the flow in a pipe 220 which receives natural gas from underground pipeline 204. A secondary pressure-control valve 214 regulates the flow of gas in a pipe 222 which receives stored natural gas from header 208. A third pressure-control valve 216 is disposed in a pipe 226 and regulates the flow of natural gas to microturbine 104 through underground turbine feeder pipe 224. Though explosion proof valves have been selected for use in the preferred embodiment, other kinds of flow-control valves, e.g., globe valves, could be used as well and still fall within the scope of the present invention.

Interposed between all three valves (212, 214, and 216) at a T-junction between pipes 220, 222, and 226 is a surge tank. A surge tank is a vessel which includes a chamber which receives gas from one or more feeder pipes and is used to absorb pressure irregularities. Here it is used to minimize any disruptive effect caused by the automated adjustments of valves 212 and 214. Otherwise manipulation of these valves might cause pressure irregularities in pipe 226 which could not be accommodated by turbine 104. Turbines require the delivery of fuel on or about some specific pressure. For example, the turbine in the preferred embodiment requires natural gas at 15 lbs. of pressure. Others require 7 lbs. or some other constant pressure. Surge tank 218 along with pressure-control valve 216 maintain steady natural gas pressures in turbine feeder pipe 224 to ensure proper operation of the turbine.

Valves 212, 214, and 216 are all electronically controlled via electrical connections which are symbolically represented by dotted lines 230, 232, and 234 respectively in the figure. Each electrical connection exists between the controller 110 (not visible in FIG. 2 because it is contained in cabinet 202) and a respective valve. The manner of electrical connection and programming required for control purposes are all within the skill of one skilled in the art. Connections 230, 232, and 234 enable each of the pressure-control valves to be individually controlled to regulate the flow rates and pressures in pipes 220, 222, and 226.

The overall objective is to, using pressure-control valves 212, 214, 216, and surge tank 218, optionally and in variable amounts, use the two natural gas sources while at the same time regulating the pressure in turbine feeder pipe 224 so that it is maintained at or close to the ideal level, e.g., 15 lbs. of pressure. Valves 212 and 214 function to select how much of each natural gas source (e.g., utility in pipe 204 or stored gas in tanks 206) is being consumed. Valve 216 is used to maintain a steady pressure level in turbine feeder pipe 224 so that the turbine operates properly.

Figure 3:
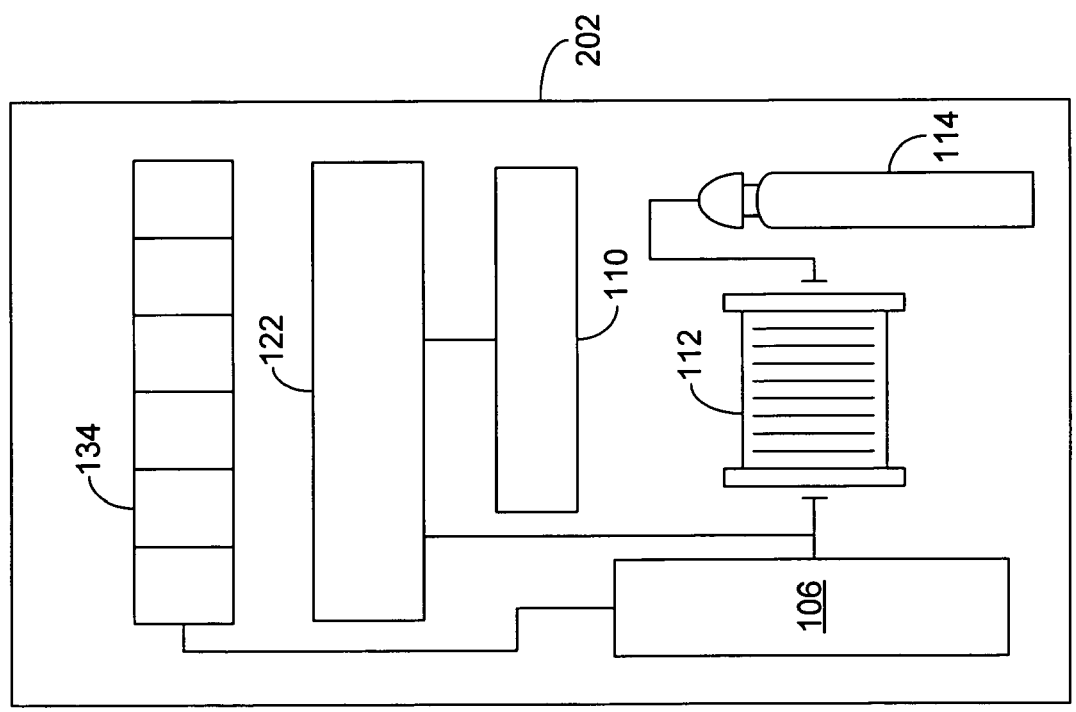
FIG. 3 shows the several components of the invention which are contained in a control cabinet.

FIG. 3 shows the contents of control cabinet 202. Cabinet 202 includes from top to bottom, SMRs 134, inverter 122, and controller 110. Included below are, from left to right, the LMPs 106, fuel cell 112, and hydrogen tank 114. Some details have been omitted for simplicity sake, e.g., some components as well as precise connection arrangements between all the devices.

A power-management flow chart 400 of FIG. 4 shows both the operational aspects of system 100 as well as different contingency plans intended to handle natural gas availability problems. The entire power management method is managed by a process which is programmed into controller 110. The FIG. 4 process assumes that valve 214 is initially closed but that valves 212 and 216 are opened up (at least partially).

In a first step 402 of the process, an inquiry is made as to whether natural gas is available from the utility pipeline. This question is answered by measuring the pressure in pipe 204 at valve 212 using a pressure sensor (not shown). Information from this sensor is received by controller 110 through line of communications 232. Using controller 110, a determination is made as to whether this pressure is above a predetermined minimum value. The minimum value is set at or slightly above what is known as the minimum pressure required to drive the turbine. If the measured pressure is above this minimum, the process moves on to a step 404.

In step 404, the surge tank will be supplied with natural gas via pipe 204 only. To do so, pressure-control valve 212 is caused by the controller (through line of communications 232) to deliver natural gas at a pressure that is at or slightly above that required by the turbine (e.g., 15 lbs.). Valve 214 remains completely closed while this is occuring.

After that, in step 405, controller 110 ensures that breaker 140 is in closed position (if it is not already in that position). This is necessary so that the controller receives power from the DC bus 130.

Next, in a step 406, the turbine generator consumes natural gas and generates AC power. The AC power is then converted to DC power by the SMRs 134. The DC power output from the SMRs 134 is introduced into DC bus 130 which maintains power to BTS 102. While this occurs, LMPs 106 will charge in a step 408 because they are connected into the DC bus. It is important that the LMPs 106 remain charged so that they are available for backup and bridging purposes if needed.

If in inquiry step 402 the pressure measured in pipe 204 at valve 212 (using a pressure sensor) is detected to be below the predetermined minimum pressure required to drive the turbine, the process moves on to a second inquiry step 410.

In step 410, an inquiry is made as to whether stored natural gas is available that, either alone or in combination with natural gas available from the utility, is sufficient to drive the turbine. The controller determines the availability of stored natural gas in tanks 206 by taking readings (through line of communications 232) from a pressure sensor (not shown) in pipe 222 at valve 214. When these readings are received by controller 110, they are considered in combination with simultaneous pressure readings from pipe 204 regarding the availability of utility natural gas and a determination is made by the controller as to whether the total natural gas available will be sufficient to meet the predetermined minimum value required to meet the fuel requirements of the turbine. If enough stored natural gas is available, the process moves on to a step 412.

In step 412 the necessary contribution of natural gas from the storage tanks 206 is introduced into surge tank 218. The controller accomplishes this by opening up valve 214 to the extent necessary to meet the fuel requirements of the turbine 104 based on all the available information. When this occurs, the stored natural gas mixes in surge tank 218 with whatever utility natural gas is available (possibly none) and then, in step 406, causes the turbine to consume the natural gas from the two sources and drive a generator. The AC power produced is then converted to DC and introduced into DC bus 130 to maintain power to the BTS.

Regardless of the mode of fuel consumption in step 406: (i) utility natural gas only, (ii) stored natural gas only, or (iii) a combined supply from both sources simultaneously, the process will continually check in a step 414 to determine whether the total natural gas available is sufficient to drive the turbine 104 and thus, meet the BTS requirements for DC power consumption. This is done by measuring the pressure at valve 216 in pipe 226 using a pressure sensor. The reading from this sensor will be received by the controller via connection 234. The controller will compare this reading to a predetermined (and stored) value which represents the minimum pressure required to effectively drive turbine 104. If the measured value is above the minimum, the process will continuously loop between turbine consumption step 406 and checking step 414 and the turbine will remain continuously operational. If, however, the supply of natural gas from both available sources is not enough to power the turbine, the answer at step 414 will be no. This will occur when: (i) there is a temporary dip in the power because of some fuel pressure irregularity, mechanical, or other momentary failure; or (ii) the turbine is completely non-functional because there is no longer enough fuel to drive it. In either case, the process will move on to a step 416.

In step 416, an inquiry is made as to whether the LMPs have enough charge to maintain the BTS 102. This is determinable by measuring the voltage in DC bus 130 using a voltage sensor (not shown). The controller will be programmed to recognize the minimum voltage which is indicative of what will satisfy the minimum power required to support the BTS power requirements. If voltage is sensed at a level above the minimum, the LMPs 106 will drain in a step 418. For temporary dips in power, the LMPs will act to bridge, causing the momentary dip to have no effect on the actual power available to the DC bus 130. For substantial/longer losses in power, the LMPs will act as a backup power source. Both scenarios are handled by the FIG. 4 process.

After step 418, the process will continually loop back to step 402 and then back through steps 410 and 416. This causes the process to continually monitor whether natural gas has become available from either of sources 204 or 206. If so, the turbine will be returned to service. If not, the LMPs 106 will continue to drain.

After a considerable amount of time without natural gas, the constant dependence on battery power will cause the charge in the batteries to become depleted. The controller 110 is programmed to recognize when voltage in the DC bus 130 drops to the point at which the BTS 102 is unable to function properly. When this occurs, the process causes breaker 140 to be thrown in a step 420. This opens up the circuit, causing control system 108 including controller 110 and fuel cell 112 to be electrically isolated from the DC bus 130.

At the same time breaker 140 is thrown, the controller also causes pressure-control valve 116 to open up. This causes hydrogen to be delivered from tank 114 to be consumed by the fuel cell to maintain power to the controller 110 in a step 422. Thus, although power has been lost to the BTS 102, control system 108 will remain functional because of the DC power produced by the hydrogen-powered fuel cell.

After step 422, the process loops back to step 402. This creates a continuous loop which will cause the controller 110 to continually monitor whether natural gas has become available from either utility source 204 or storage tanks 206. If so, the turbine will come back online and the process (pursuant to steps 402, 404, 405, and 406 or steps 410, 412, 405, and 406) will cause the system to revert back to AC production and recharge the LMPs (in step 408). But if natural gas is still not available, the fuel cell will continue to operate in step 424 in order to keep the controller 110 powered.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A fuel-control system for a gas consuming device, said system comprising:
    a controller;
    a first source of a first gas received through a first conduit, said conduit leading into a chamber;
    a first pressure-control valve in said first conduit;
    a first sensor at a location in said first conduit, said first sensor reading information regarding a first pressure, said information regarding said first pressure being transmittable to said controller;
    a second source of a second gas derived from a storage container through a second conduit into said chamber;
    a second pressure-control valve in said second conduit; and
    a second sensor at a location in said second conduit, said second sensor reading information regarding a second pressure, said information regarding said second pressure being transmittable to said controller;
    said controller adapted to manipulate said first and second pressure-control valves in response to said first and second readings to maintain a steady pressure level in a third conduit, said third conduit running from said chamber to said gas consuming device.

2. The system of claim 1, comprising:
    a third pressure-control valve and a third sensor located in said third conduit, said third sensor reading information regarding a third pressure, said information regarding said third pressure being transmittable to said controller, said controller adapted to manipulate said first, second, and third pressure-control valves in response to said first, second, and third readings to maintain a steady pressure level in a third conduit.

3. The system of claim 1 wherein said fuel consuming device is a turbine.

4. The system of claim 1 wherein said first and second gases are natural gas.

5. The system of claim 1 wherein said controller is one of a microprocessor and a programmable logic control device.

6. The system of claim 1 where the controller is electrically coupled with a back up power system which includes a fuel cell.

7. The system of claim 1 in which said chamber is a surge tank.

* * * * *